(12) United States Patent
Kimura et al.

(10) Patent No.: US 6,341,820 B1
(45) Date of Patent: Jan. 29, 2002

(54) SEAT BACK LOCK DEVICE FOR VEHICLES

(75) Inventors: Satoshi Kimura; Nobuhiko Takeda, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/627,782

(22) Filed: Jul. 28, 2000

(30) Foreign Application Priority Data

Jul. 30, 1999 (JP) ............................................ 11-216527

(51) Int. Cl.7 ................................................. A60N 2/20
(52) U.S. Cl. ................................. 297/378.13; 296/65.16
(58) Field of Search .................... 297/378.13; 296/65.16

(56) References Cited

U.S. PATENT DOCUMENTS

| | | | | | |
|---|---|---|---|---|---|
| 4,721,338 A | * | 1/1988 | Kondo | ................... | 297/378.13 |
| 4,770,459 A | | 9/1988 | Nakaiwa et al. | | |
| 4,880,264 A | * | 11/1989 | Yamazaki et al. | .. | 297/378.13 X |
| 4,904,003 A | * | 2/1990 | Yamazaki et al. | .. | 297/378.13 X |
| 5,713,634 A | * | 2/1998 | Koike | ................... | 297/378.13 |
| 5,741,046 A | * | 4/1998 | Leuchtmann et al. | .. | 297/378.13 |
| 5,762,401 A | * | 6/1998 | Bernard | ................... | 297/378.13 |
| 5,855,414 A | * | 1/1999 | Daniel et al. | ........... | 297/378.13 |
| 6,132,000 A | * | 10/2000 | Tanaka | ................... | 297/378.13 |

FOREIGN PATENT DOCUMENTS

| | | |
|---|---|---|
| JP | 63-47948 | 3/1988 |
| JP | 2-28988 | 8/1990 |

* cited by examiner

Primary Examiner—Beth A. Stephan
Assistant Examiner—Brian E. Glessner
(74) Attorney, Agent, or Firm—Burns, Doane, Swecker & Mathis, LLP

(57) ABSTRACT

A vehicle seat back lock mechanism includes a releasable latch connectable to a fixed part of the vehicle for preventing rotation of the seat back. A manual operating element is movable to disengage the latch by rotating a rotational lever which, in turn, moves a connecting rod connected to the latch. The connecting rod can be shifted so that it cannot be moved by the rotational lever. That shifting is done by sliding a cancelling lever which is connected to the connecting rod, thereby sliding the connecting rod within a slot formed in the rotational lever until the connecting rod reaches a part of the slot oriented to prevent the connecting rod from being moved when the rotational lever rotates.

16 Claims, 6 Drawing Sheets

SEAT BACK LOCK DEVICE FOR VEHICLES

BACKGROUND OF THE INVENTION

1. Field of the Invention

This invention relates to a vehicle seat device and more particularly to a lock device of a seat back for a vehicle seat assembly.

2. Prior Art

As prior art, a lock device for a seat back is disclosed in a Japanese Utility Model Application situ-kai-sho 63(1988)-47948 published in 1988. This prior art discloses a seat back lock device for a vehicle seat assembly having a latch mechanism engaging with or disengaging from a striker secured on the vehicle body, an operating element for causing the latch mechanism to be disengaged from the striker, and a cancelling mechanism disposed between the latch mechanism and the operating element for permitting or preventing the transmission of the latch-disengagement force from the operating element to the latch mechanism.

According to this prior art, the cancelling mechanism includes a cancelling lever for the cancelling operation, a first rotation lever engaged with the operating element, a second rotation lever engaged with the latch mechanism, and a lock pin. The lock pin is inserted into the cancelling lever, the first and second rotation levers and engages with, or disengages from, the first and second rotation levers.

According to the structure of the prior art, the cancelling lever is operated to move the lock pin relative to the first and second rotation levers. This movement of the lock pin engages or disengages the first and second rotation levers to permit or prevent a transmission of the latch-disengagement force from the operation element to the latch mechanism.

The lock pin has to be associated with the three levers (cancel lever, first lever and second lever) by being inserted into the three levers. It is therefore necessary for this structure to have at least three levers and one lock pin and other components to assemble or operatively fix these parts.

SUMMARY OR THE INVENTION

Accordingly, it is an object of the present invention to provide an improved seat back lock device for a vehicle seat. It is another object of the present invention to provide an improved seat back lock device which is compact in structure and has fewer components.

According to the present invention, the seat back lock device includes a cancelling lever for operating a cancelling mechanism, a rotational lever operatively connected to an operating element, and a connecting rod engageably inserted into the rotational lever. One end of the connecting rod being connected to a latch mechanism and the other end being connected to the cancelling lever.

Thus constructed present invention has the following advantages. By moving the connecting rod relative to the rotational lever by operating the cancelling lever, a drive connection between the connecting rod and the rotational lever can be selectively created or released, to permit or prevent the transmission of the operating force from the operating element to the latch mechanism. Accordingly, the second rotational lever used in the prior art mentioned above can be eliminated by an arrangement wherein the connecting rod performs the functions of both the second rotational lever and the connecting rod of the prior art, thereby reducing the number of components.

It is another aspect of the present invention to provide an L-shaped elongated hole in the rotational lever for inserting the connecting rod thereinto.

It is still another aspect of the present invention to provide a base bracket mounted on the latch mechanism for rotatably supporting the rotational lever.

It is a further object of the invention to provide a seat back lock device including the connecting rod movably disposed between the rotational lever and the base bracket.

It is still another object of the present invention to provide the cancelling lever slidably supported on the base bracket.

Another aspect of the invention is to provide a seat back lock device having a supporting portion formed on the rotational lever to support the cancelling lever in cooperation with the base bracket.

Preferably the seat back lock device of the present invention includes the cancelling lever integrally formed with the operating element to be operated by an occupant of the seat and held in either connected position or released position by a turn over spring.

BRIEF DESCRIPTION OF THE DRAWINGS

A more complete appreciation of the invention and other advantages thereof will be readily obtained as the same becomes better understood by reference to the following detailed description of a preferred embodiment of the invention when considered in connection with the accompanying drawings, wherein.

DETAILED DESCRIPTION OF A PREFERRED EMBODIMENT OF THE INVENTION

Figure 1:
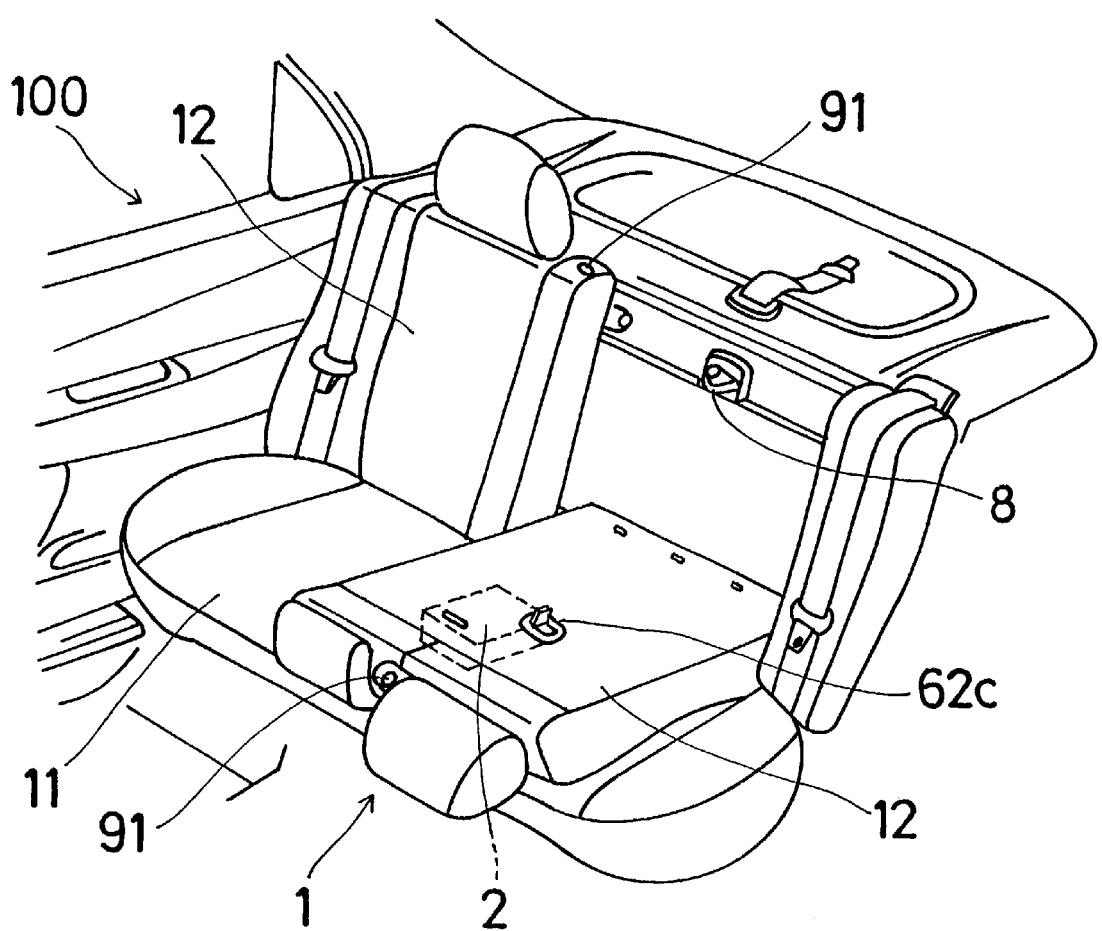
FIG. 1 shows a perspective view of a seat applied with a seat back lock device according to the invention.

Referring now to the embodiment of the seat back lock device of the present invention with reference to the attached drawings, wherein a rear seat assembly 1 of a vehicle 100 partially shown in FIG. 1 is supported on the vehicle floor and is comprised of a seat cushion 11 and a seat back 12.

The seat back 12 is pivotally supported on the rear part of the seat cushion 11 and capable of being switched from the normal use position (this position is shown at the left side of FIG. 1) to a folded position (right side of FIG. 1) by a pivotal movement.

In connection with the normal use position, i.e., when the seat back is upright so that the occupant can sit on the seat, the vehicle compartment is divided into two parts, i.e., passenger space and load space. In connection with the folded position, the vehicle compartment exhibits a larger load space.

A seat back lock device 2 is schematically shown in FIG. 1. The seat back lock device 2 is engageable with an anchor in the form of a striker 8 secured to a vehicle fixed part, such as frame or inner trim portion. The seat back lock device 2 is housed in the seat back 12 and includes a base bracket 3, a latch mechanism 4, and a cancelling mechanism 5.

Figure 2:
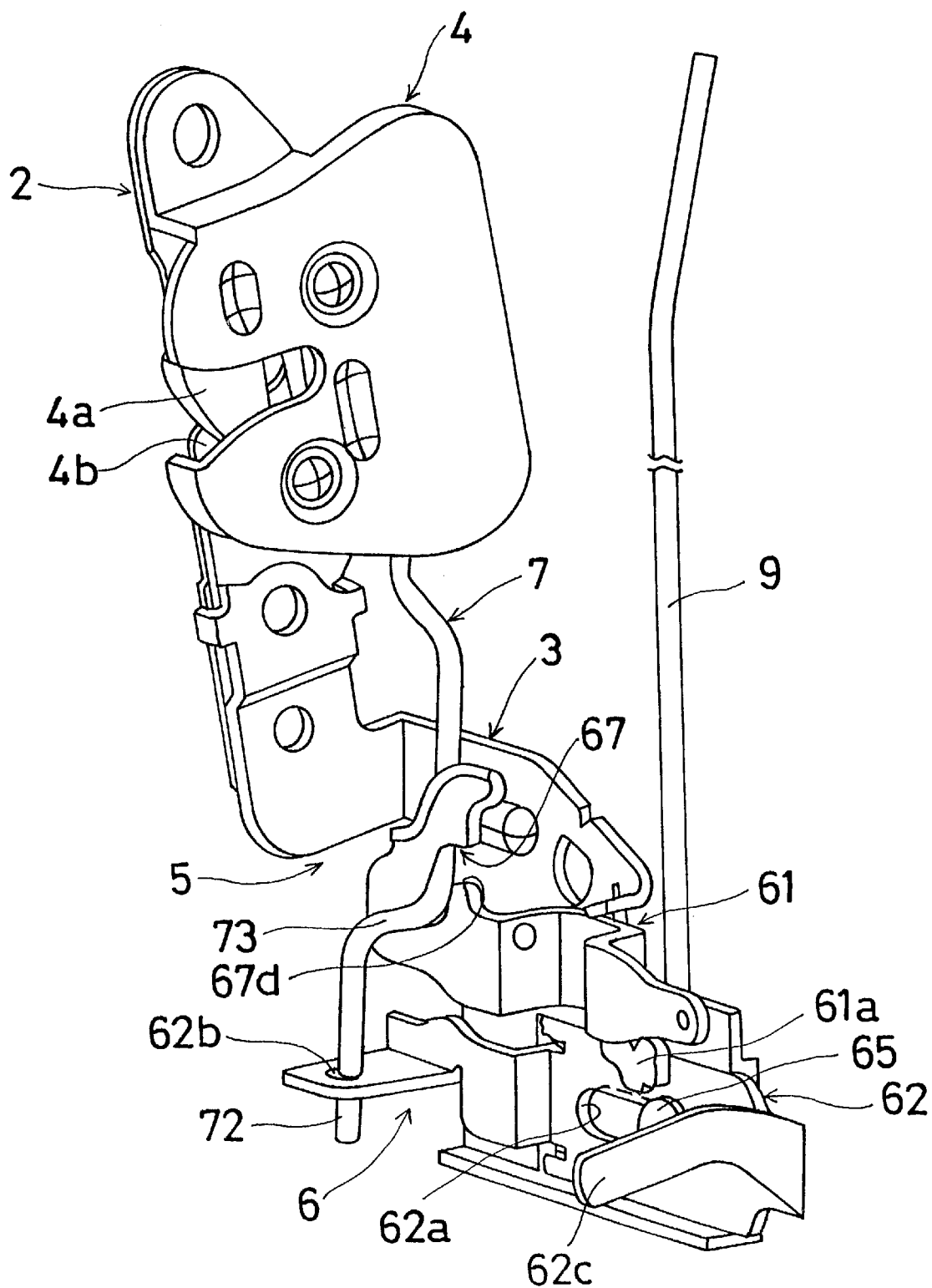
FIG. 2 shows a perspective view of the seat back lock device shown in FIG. 1.
Figure 3:
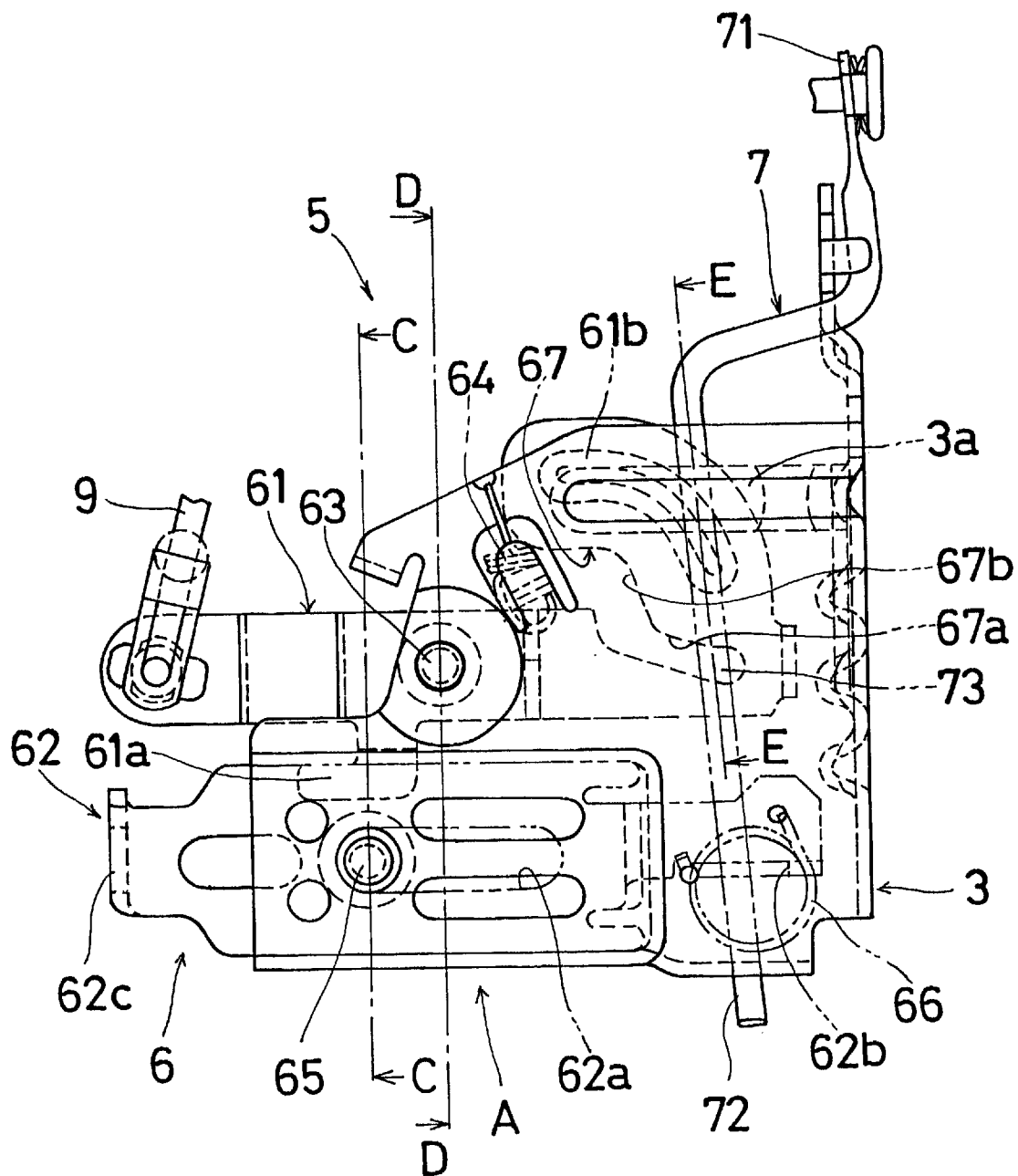
FIG. 3 shows a front view of the seat back lock device when a cancelling lever is in a "connect" position for permitting the seat back to be unlocked for rotation.

As shown in FIG. 2 and FIG. 3, the base bracket 3 is secured to a seat back frame (not shown) and carries the latch mechanism 4 and the cancelling mechanism 5.

The latch mechanism 4 is a well-known spring-biased latch-and-pawl type in which a latch 4*a* is engageable with, or disengageable from, the striker 8, and a pawl or lever 4*b* is engageable with the latch 4*a* to restrict the rotation of the latch. A suitable latch mechanism of that type is described in U.S. Pat. No. 4,770,459, the disclosure of which is incorporated by reference herein.

The pawl 4*b* is connected to a first end 71 of a connecting rod 7 which connects a lever mechanism 6 of the cancelling mechanism 5 with the latch mechanism 4. By displacing the rod 7 downwardly, the pawl 4*b* releases the latch 4*a*, whereupon the latch 4*a* releases the striker 8, as described in detail in U.S. Pat. No. 4,770,459.

Figure 4:
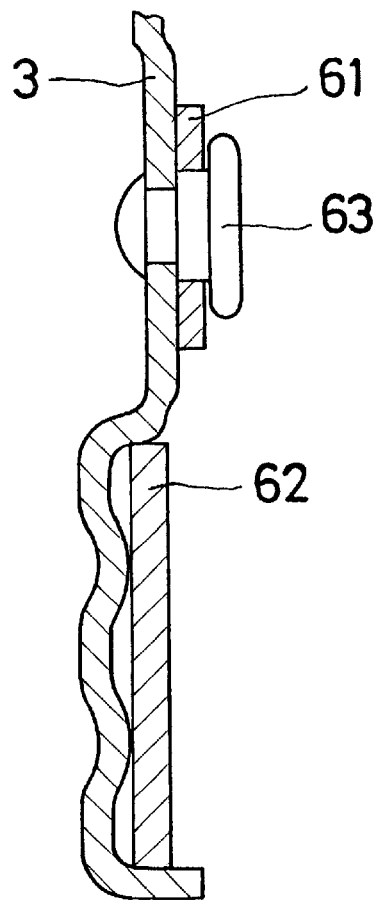
FIG. 4 shows a cross sectional view taken along the line C—C of FIG. 3.
Figure 5:
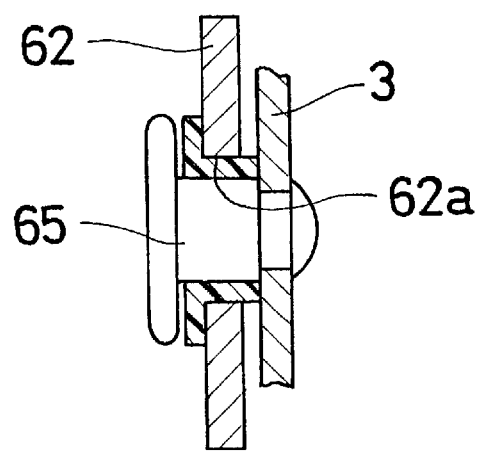
FIG. 5 shows a cross sectional view taken along the line D—D of FIG. 3.

In FIG. 2 and FIG. 3, the cancelling mechanism 5 includes the connecting rod 7 and the lever mechanism 6. The lever mechanism 6 includes a rotational lever 61 and a cancelling lever 62. The rotational lever 61 is rotatably supported on the base bracket 3 by pin 63 as shown in FIG. 3 or FIG. 4.

The rotational lever 61 is connected at its ends to an operating element comprising a knob 91 (shown in FIG. 1) attached to a rod 9. The operation knob 91 is located on the upper portion of the seat back 12 and operable by a vehicle occupant.

A coil spring 64 is disposed between the rotational lever 61 at one end and the base bracket 3 at the other end for providing a tensional force therebetween. The rotational lever 61 is always urged in a counterclockwise direction as viewed in FIG. 3 by the biasing force of the coil spring 64.

The cancelling lever 62 is slidably supported by pin 65 on the base bracket 3. The cancelling lever 62 is provided with an elongated slot 62*a* extending in a slidable direction of the lever 62. The pin 65 is inserted into this slot 62*a* to define the amount of the slidable movement.

An operation knob 62*c* is formed integrally with the cancelling lever 62. The knob 62*c* is disposed on the rear side of the seat back 21 as shown in FIG. 1 or FIG. 3. The occupant or passenger of the vehicle can manually operate the knob 62*c* from the load space.

A turn-over spring 66 of conventional design is provided between the base bracket 3 and the cancelling lever 62. One end of the spring 66 is engaged with the bracket 3 and the other end is engaged with the lever 62 for elastically holding the lever 62 in whichever of its two positions that it has been manually moved to (i.e., a position A of FIG. 3 or a position B of FIG. 8).

The rotational lever 61 is provided with a supporting portion 61*a* projecting toward the cancelling lever 62. The cancelling lever 62 is slidable between the supporting portion 61a and the base bracket 3 to be guided in position in the thickness direction of the bracket 3, thus eliminating any chattering or undesired movement.

The connecting rod 7 is situated between the base bracket 3 and the rotational lever 61, and a second end 72 of the rod 7 is inserted into an elongated hole 62*b* formed in the cancelling lever 62 to be engaged with the lever 62. The middle portion of the connecting rod 7 is bent like a crank shape and passes through a slot 67 formed in the rotational lever 61 to form an engagement portion 73 which can engage the lever 61.

Figure 6:
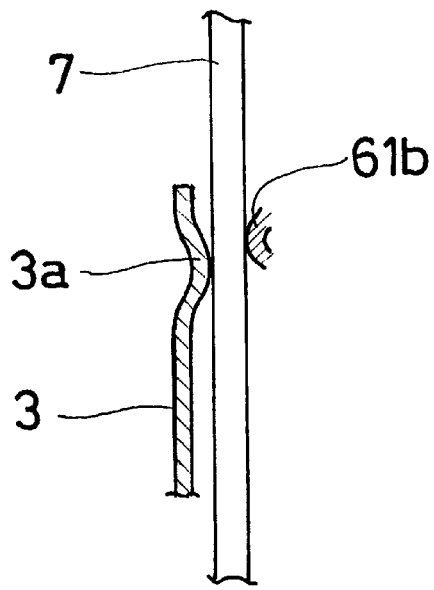
FIG. 6 shows a cross sectional view taken along the line E—E of FIG. 3.

As clearly shown in FIG. 6, rib portions 61*b* and 3*a* are formed respectively on the rotational lever 61 and the base bracket 3 and are opposed to each other. The connecting rod 7 is supported between the rib portions 61*b* and 3*a*.

The elongated slot 67 is L-shaped, having an engagement portion 67*a* extending along the longitudinal direction and an idle striking portion 67*b* extending from one end of the engagement portion 67*a* in a vertical direction.

In order to easily assemble the connecting rod 7 with the rotational lever 61, the elongated L-shaped slot 67 has a recess 67*d* extending from the upper end of the idle striking portion 67*b* to an edge of the rotational lever 61 in a direction opposite to the engagement portion 67*a*, and forming an opening at the edge.

Figure 7:
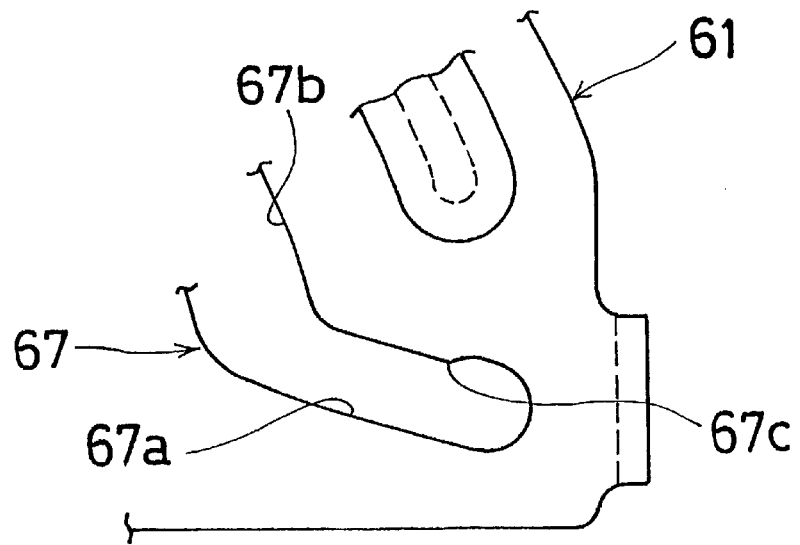
FIG. 7 shows an enlarged view of an elongated hole of the seat back lock device of the present invention.
Figure 8:
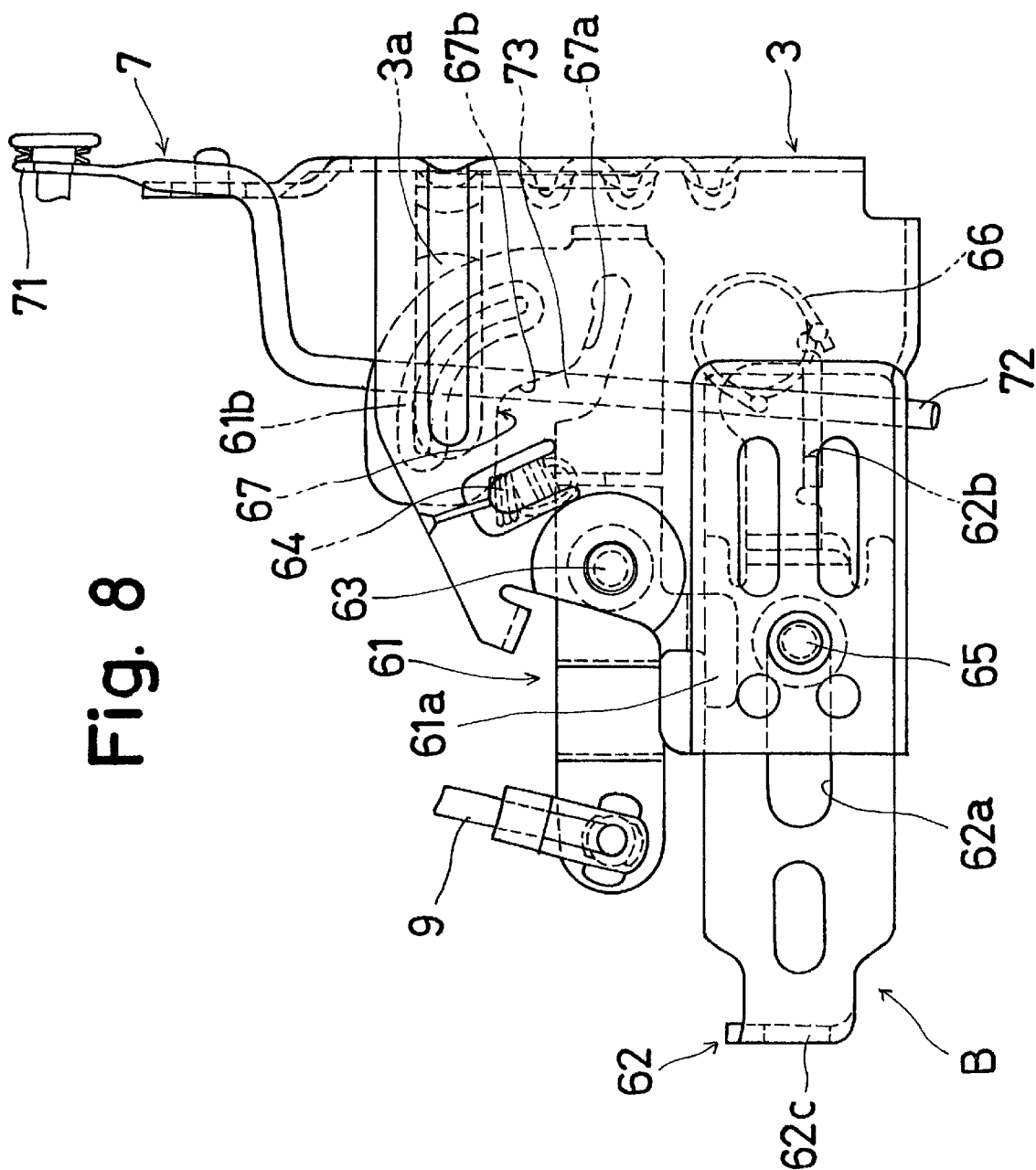
FIG. 8 shows a front view showing the operation of the seat back lock device as shown in FIG. 2, wherein the cancelling lever is in a "release" position preventing the seat from being unlocked.

The engagement portion 73 of the connecting rod 7 is inserted into the recess 67*d* of the elongated slot 67 of the rotational lever 61 until it reaches the engagement portion 67*a* of that slot. By sliding the cancelling lever 62, the engagement portion 73 is moved along the engagement portion 67*a*. When the cancelling lever 62 is positioned at the release position B, the engagement portion 73 is located at an outer end of the engagement portion 67*a*, in other words, it is at the bottom of the idle striking portion 67*b* (FIG. 8). When the cancelling lever 62 is positioned at the engagement portion A, the engagement portion 73 is located at an inner end of the engagement portion 67*a* of the slot 67 (FIG. 3). As shown in FIG. 7, the groove width of the inner end of the engagement portion 67*a* (the "width" is measured in the up-down direction of FIG. 3 or FIG. 7) is larger than the width of an adjacent portion of the engagement portion 67*a* to form a stepped portion 67*c* therebetween.

Now explaining the operation of the invention, with the seat assembly 1 being in a normal use position, the operation knob 91 can be operated by the occupant or the passenger of the seat to lift the connecting rod 9, whereupon the operational lever 61 is rotated in a clockwise direction against the spring force of the coil spring 64 as viewed in FIG. 3.

Under this condition, with the cancelling lever disposed in the connect position of FIG. 3, the engagement portion 73 of the rod 7 is positioned at the inner end of the engagement portion 67*a* of the elongated hole 67, whereby the engagement portion 73 of the rod 7 contacted by the groove's upper wall and pushed down thereby as the rotational lever 61 rotates clockwise as viewed in FIG. 3.

Accordingly, the latch mechanism 4 is operated to release the engagement with the striker 8, making the seat back 12 free to be rotated frontward. When the rotational lever 61 moves the connecting rod 7 downward, the engagement portion 73 of the connecting rod 7 enters the stepped portion 67*c* of the hole 67, so any undesired movement of the engagement portion 73 along the engagement portion 67*a* of the hole 67 is restricted.

When the seat assembly 1 is in a normal use position, and it is desired to prevent the latch mechanism from being disengaged from the striker, the operation knob 62*c* is manually engaged to move the cancelling lever 62 from the connect position A of FIG. 3 to the release position B of FIG. 8. The engagement portion 73 of the connecting rod 7 is thus moved along the engagement portion 67*a* of the elongated hole 67 (to the left in FIG. 8) until the rod 7 is positioned at the bottom of the idle striking portion 67*b*. In this condition, when the knob 91 is operated to pull up the connecting rod 9, the rotational lever 61 is rotated in the clockwise direction as viewed in FIG. 8 against the spring force of the coil spring 64. The engagement portion 73 of the rod 7 remains stationary within the striking portion 67*b* of the slot 67 as the rotational lever 61 rotates. That is, the striking portion 67*b* moves relative to the engagement portion 73. Accordingly, the connecting rod 7 is not moved and the latch mechanism 4 is not operated, thereby preventing a pivotal movement of the seat back 12.

To permit the latch to be disengaged from the striker 8, the cancelling lever 62 is manually moved to the connect position B of FIG. 3 to move the connecting rod 7 into an inner part of the engagement portion 67a of the slot 67. Then, when the connecting rod 9 is raised, the operational lever 61 is able to move the connecting rod 7 downwardly.

According to the invention, the cancelling lever is supported on the base bracket to which the latch mechanism is attached. At the same time, the operating element of the cancelling lever is integrally formed with the cancelling lever thereby to eliminate the need for a cable for interconnecting the cancelling lever and its operating element. The number of components, and the complexity of the system are thus reduced.

Having now fully described the invention, it will be apparent to one of ordinary skill in the art that many changes and modifications can be made without departing from the spirit or scope of the invention as set forth herein.

What is claimed is:

1. A seat for a vehicle, comprising:
   a rotatable seat back;
   a latch mechanism for selectively connecting the seat back to an anchor to prevent rotation of the seat back, and disconnecting the seat back from the anchor to permit the rotation;
   a latch-operating mechanism comprising:
      an operating element movable in first and second directions;
      a rotatably mounted rotational lever connected to the operating element to be rotated in first and second directions in response to movement of the operating element in the first and second directions, respectively,
      a connecting rod connected to the latch mechanism and being selectively shiftable between first and second positions relative to the rotational lever; the connecting rod, when in its first position, being in driven relationship with the rotational element for being moved in response to rotation thereof for controlling the latch mechanism; the connecting rod, when in its second position, being in non-driven relationship with the rotational element, and a movable cancelling lever operably connected to the connecting rod for shifting the connecting rod between its first and second positions.

2. The seat according to claim 1, wherein the rotational lever includes an elongated L-shaped slot through which the connecting rod extends.

3. The seat according to claim 2, wherein the cancelling lever is slidable between a connect position for establishing the drive relationship between the connecting rod and the rotational lever, and a release position for decoupling the drive relationship, the cancelling lever further including a manual operation portion integrally formed on the cancelling lever, and wherein a spring is provided to keep the cancelling lever in whichever of the connect position and release position to which it has been manually moved.

4. The seat according to claim 1, further comprising a base bracket attached to the latch mechanism for rotatably supporting the rotational lever.

5. The seat according to claim 4, wherein the connecting rod is movably supported between the rotational lever and the base bracket.

6. The seat according to claim 5, wherein the cancelling lever is slidably supported on the base bracket.

7. The seat according to claim 5, further comprising a supporting portion formed on the rotational lever for supporting the cancelling lever in cooperation with the base bracket.

8. The seat according to claim 5, wherein the cancelling lever is slidable between a connect position for establishing the drive relationship between the connecting rod and the rotational lever, and a release position for decoupling the drive relationship, the cancelling lever further including a manual operation portion integrally formed on the canceling lever, and wherein a spring is provided to keep the cancelling lever in whichever of the connect position and release position to which it has been manually moved.

9. The seat according to claim 5, wherein the cancelling lever is slidably supported on the base bracket.

10. The seat according to claim 9, further comprising a supporting portion formed on the rotational lever for supporting the cancelling lever in cooperation with the base bracket.

11. The seat according to claim 9, wherein the cancelling lever is slidable between a connect position for establishing the drive relationship between the connecting rod and the rotational lever, and a release position for decoupling the drive relationship, the cancelling lever further including a manual operation portion integrally formed on the canceling lever, and wherein a spring is provided to keep the cancelling lever in whichever of the connect position and release position to which it has been manually moved.

12. The seat according to claim 4, further comprising a supporting portion formed on the rotational lever for supporting the cancelling lever in cooperation with the base bracket.

13. The seat according to claim 12, wherein the cancelling lever is slidable between a connect position for establishing the drive relationship between the connecting rod and the rotational lever, and a release position for decoupling the drive relationship, the cancelling lever further including a manual operation portion integrally formed on the cancelling lever, and wherein a spring is provided to keep the cancelling lever in whichever of the connect position and release position to which it has been manually moved.

14. The seat according to claim 4, wherein the cancelling lever is slidable between a connect position for establishing the drive relationship between the connecting rod and the rotational lever, and a release position for decoupling the drive relationship, the cancelling lever further including a manual operation portion integrally formed on the cancelling lever, and wherein a spring is provided to keep the cancelling lever in whichever of the connect position and release position to which it has been manually moved.

15. The seat according to claim 1, wherein the cancelling lever is slidable between a connect position for establishing the drive relationship between the connecting rod and the rotational lever, and a release position for decoupling the drive relationship, the cancelling lever further including a manual operation portion integrally formed on the cancelling lever, and wherein a spring is provided to keep the cancelling lever in whichever of the connect position and release position to which it has been manually moved.

16. The seat according to claim 1 wherein the connecting rod includes a first end connected to the latch mechanism, a second end connected to the cancelling lever, and an intermediate engagement portion slidably disposed in a slot formed in the rotational lever; the slot including an engagement portion and an idle portion oriented at an angle relative to one another; the cancelling lever being manually movable to position the engagement portion of the connecting rod selectively in:
   the engagement portion of the slot to effect a drive relationship between the connecting rod and the rotational lever, and
   the idle portion of the slot to uncouple the drive relationship.

* * * * *